United States Patent [19]
Fukuda et al.

[11] 3,892,592
[45] July 1, 1975

[54] METHOD OF MANUFACTURING ELECTRODES FOR FUEL CELLS

[75] Inventors: Masataro Fukuda, Takatsuki; Tsutomu Iwaki, Kyoto, both of Japan

[73] Assignee: Matsushita Electric Industrial Co., Ltd., Kadoma, Japan

[22] Filed: Oct. 23, 1973

[21] Appl. No.: 408,560

Related U.S. Application Data

[63] Continuation-in-part of Ser. No. 146,126, May 24, 1971, abandoned, which is a continuation of Ser. No. 794,157, Jan. 27, 1969, abandoned.

[30] Foreign Application Priority Data

Jan. 31, 1968  Japan.................................. 43-6320
Sept. 19, 1968  Japan.............................. 43-68981
Sept. 20, 1968  Japan.............................. 43-69028

[52] U.S. Cl....... 136/120 FC; 136/86 D; 117/130 B
[51] Int. Cl. .......................................... H01m 27/10
[58] Field of Search........ 136/120 FC, 120 R, 86 D; 117/130 B, 160 B, 217

[56] References Cited
UNITED STATES PATENTS

| | | | |
|---|---|---|---|
| 3,281,282 | 10/1966 | Barber | 136/122 |
| 3,309,231 | 3/1967 | Hess | 136/122 |
| 3,400,019 | 9/1968 | Le Duc | 136/120 FC |
| 3,429,750 | 2/1969 | Waters | 136/120 FC |

*Primary Examiner*—Anthony Skapars
*Attorney, Agent, or Firm*—Stevens, Davis, Miller & Mosher

[57] ABSTRACT

A method of manufacturing an electrode for batteries using hydrazine or the like as fuel, which electrode has an electrode substrate carrying a layer of copper and nickel or nickel boride as a catalyst and a metal of the platinum group deposited on said layer, said method including a step of immersing the electrode substrate into a solution of a salt of the metal of the platinum group to deposit said metal by utilizing the difference in ionization tendency between said metal and nickel, whereby the amount of metal of the platinum group to be added is reduced and an electrode is obtained which is highly active and has a long service life.

16 Claims, 2 Drawing Figures

METHOD OF MANUFACTURING ELECTRODES FOR FUEL CELLS

CROSS-REFERENCE TO RELATED APPLICATION

This is a continuation-in-part application of the U.S. Ser. No. 146126 filed on May 24, 1971 which is in turn the continuation application of U.S. Ser. No. 794,157, filed on Jan. 27, 1969, both now abandoned.

BACKGROUND OF THE INVENTION

1. Field of the Invention

The present invention relates to a method of manufacturing electrodes for batteries, particularly to a method of manufacturing fuel electrodes adapted for use in such fuel cells which make use of fuels, such as hydrazine, sodium borohydride and hydrogen, with which mainly hydrogen ion participates in the electrochemical reaction. More particularly, the present invention relates to a provision of electrodes for batteries, in which is used a catalyst consisting mainly of a mixture of nickel and copper and further having a metal of the platinum group, such as palladium, platinum, iridium or rhodium, precipitated on said mixture after or without adding a third compound, such as iron or cobalt to said mixture.

2. Description of the Prior Art

In the so-called fuel cells wherein fuel is oxidized electrochemically to produce electric power, use of such compounds as hydrazine, sodium borohydride and hydrogen as fuel is advantageous in that the polarization of the fuel electrode in the cell to which such fuels are supplied can be minimized even during discharge of the cell at a high current density, because said compounds are active. For this reason, attention has been focussed on the use of such compounds as fuel for small-sized, highvoltage fuel cells. Namely, a fuel cell of the type wherein an oxidizing electrode operative with a suitable oxidizing agent, e.g. air, and a fuel electrode operative with fuel are arranged in opposed relation in pair and an electrolyte is filled between said electrodes, can be made capable of discharging at a high current density with minimum polarization by incorporating a suitably selected catalyst in said electrodes. The catalysts used for the oxidizing electrode generally include active carbon, silver and metal oxides, and the catalysts used for the fuel electrode include platinum, palladium and alloys of said metals with other metals. However, since the catalysts for the fuel electrode are generally considerably more expensive as compared with the catalysts for the oxidizing electrode, many proposals have been made hitherto as to the process for incorporating the catalysts to the electrode, the amount of said catalysts and the additives to be used with the catalysts, with a view of reducing the cost of the electrode.

Many attempts have been made to reduce the amount of the catalyst by promoting the catalytic activity of the catalyst, and a fairly successful result has been obtained. Namely, it is now said that an amount of 1 mg. or less of the catalyst per 1 cm$^2$ of the electrode suffices for the purpose when the electrode is operated at elevated temperatures. However, such an electrode is not yet entirely satisfactory because it is subjected to such limitations that it must be operated at elevated temperatures and that its service life is shorter than desired. In addition, in a cell in which each unit cell is large in size and yet a large number of such unit cells are juxtaposed one to another, the total amount of the catalyst becomes huge. It will, therefore, be obvious that for the practical use of a fuel cell it is very important to reduce the amount of the catalyst and it is also important for the catalyst to maintain its catalytic activity over an extended period.

In view of the above, "non-noble metal catalysts", such as nickel black, nickel boride and iron, have been examined for use as electrochemical catalyst for hydrazine, sodium borohydride and hydrogen. These compounds are considerably cheaper than platinum or other noble metals but are inferior to the latter in respect of durability of catalytic activity, which is more important than cost. For instance, when nickel boride or iron is used as a catalyst for the fuel electrode in a fuel cell using hydrazine as fuel, the catalyst remains active and polarization of the electrode is small in the initial stage of discharge. In this case, if the service life of the cooperating oxidizing electrode, i.e. gas diffusion electrode operative with oxygen or air, is short as was the case in the past, and therefore the discharge performance of the electrode is attenuated rendering the electrode unserviceable, a voltage drop of the fuel electrode is not so important because the deterioration of the fuel electrode is not so quick as that of the oxidizing electrode. However, now that research on the gas diffusion electrode as an oxidizing electrode is advanced and it is possible to prolong the service life of said electrode, the fuel electrode is more liable to the service life of a cell in which it is used. Practically speaking, with either nickel boride or iron, the fuel electrode operates satisfactorily up to about 1,000 hours with no substantial voltage drop but when the operation time exceeds several thousands hours, the potential of the electrode drops greatly from the initial level causing a substantial voltage drop of the cell. Having examined the cause of such potential drop, it has been found that the potential drop is caused mainly by the oxidation of the surface of these metal catalysts, though removal of the catalyst from the electrode is partially responsible. Namely, during the discharge operation, these metal catalysts are polarized anodically even in the presence of a reducing substance such as hydrazine, and this is probably the reason why the catalysts are oxidized slowly over an extended period. Such oxidation is further promoted by the occurrence of a contingent trouble, e.g. shortage of fuel in the electrolyte in the cell or shortage of hydrogen gas where hydrogen gas is used, or by the discharge of a current larger than in normal discharge. For instance, once the potential has dropped to the level at which oxygen is generated from the fuel electrode, due to fuel shortage, the original potential cannot be recovered even when ample fuel is again supplied to the electrode. Although the catalysts consisting primarily of a nickel compound, such as nickel black or nickel boride, have the disadvantage as described above, they do not have such a defect as dissolving in the electrolyte since they are resistant to alkaline solution.

SUMMARY OF THE INVENTION

It has been discovered that by adding platinum or palladium to the nickel black or nickel boride, a satisfactory electrode can be obtained with a smaller amount of platinum or palladium than in the case of adding such a noble metal directly to the substrate electrode, because nickel black or nickel boride provides a good carrier for the noble metal and further because nickel black or nickel boride has a catalytic activity per se relative to active fuel such as hydrazine.

Thus the present invention relates to a method of producing such electrodes for use in fuel cells, which electrode has a catalyst layer comprising a nickel catalyst, such as nickel black or nickel boride and platinum or palladium carried on said carrier, and said catalyst layer may further comprise copper, more particularly, in the process of producing the electrodes, the present invention relates to a method of adding a metal of the platinum group to the catalyst layer comprising nickel and/or copper.

Even though the amount of platinum or palladium used is reduced according to the method of the present invention, a satisfactory discharge performance of the electrode can be maintained due to the fact that the layer of the mixture of nickel or nickel boride and copper serves as an excellent carrier for said noble metal catalyst and furthermore the constituents of said layer also have a catalytic activity. Copper contained in the carrier has the effect of suppressing oxidation of nickel or the like during the discharge operation and such effect of copper is assumed to account for the electrode maintaining a satisfactory discharge performance over an extended period as a whole.

A mixture of nickel and copper may be obtained by decomposition of salts of both metals at elevated temperatures, reduction of the salts with hydrazine or the like in an aqueous alkali solution or electrodeposition of said metals. A mixture of nickel boride and copper may be obtained by reduction of salts of both compounds with sodium borohydride or the like. While these mixtures may be prepared by mixing the respective ingreidents prepared separately, it appears that a better result can be obtained when the mixtures are formed by reducing a mixed solution of the respective salts. The mixture thus obtained is then combined with the known catalysts. In this case, platinum or palladium may be incorporated in the mixture concurrently with the preparation of said mixture by mixing a salt of platinum or palladium with the salts of the metals constituting said mixture, or may alternatively be added to the mixture after preparation of the latter. One of the most preferable processes for forming the catalyst layer comprises the steps of forming a mixture layer of nickel and copper or nickel boride and copper on a porous sintered metal substrate, particularly on a sintered nickel substrate, using said sintered usbstrate as an electrode, and thereafter depositing a known catalyst metal, such as palladium or platinum, on said mixture layer from a salt of said metal by making use of the difference in ionization tendency. This process is simple and enables an electrode to be obtained which has an active catalyst. The present inventors have found that in operating the process described above, highly efficient deposition of platinum or palladium and a strong bond of the same with the substrate electrode can be obtained by using, as a solvent for the platinum salt or palladium salt, an organic solvent, for example, alcohol or acetone containing slight amounts of water and acid instead of using water only. It has also been found that where platinum or palladium is to be deposited on a substrate electrode consisting solely of nickel in such an organic solvent, the platinum or palladium partially remains in the solvent without completely depositing on the substrate even when the depositing reaction system is left to stand over a lengthy period but when copper is incorporated in the substrate, the platinum or palladium can be deposited completely and furthermore the bond between the deposited platinum or palladium and the substrate is stronger than in the case of depositing the same completely using a solvent consisting mainly of water as a solvent. Namely, addition of even a small amount of copper brings about such a remarkable effect as described above.

As mentioned above, it is carried out only by dipping the substrate comprising nickel and copper into the solution of the salt of the catalysts that the metal of the platinum group is precipitated to be brought into appearance by making use of the difference in the ionization tendency after the formation of the substrate having nickel and copper. Namely, in principle, the nickel and copper are dissolved in the form of nickel ions $Ni^{++}$ and copper ions $Cu^{++}$ into the solution, on the other hand the metal ion of the platinum group of the solution e.g. palladium ion $Pd^{++}$ is precipitated as palladium metal Pd on the substrate. This is the process of the precipitation of the platinum group metal, depending upon the difference in the ionization tendency between the nickel and the metal of the platinum group. The process is obserbed as such a phenomenon that, in the case of using palladium chrolide as a salt of palladium for example, a brown color of the solution of the salt is gradually made colorless after the immersion of the substrate into the solution, and thereafter the color of the solution represents the color of the nickel ions $Ni^{++}$, i.e. thin green at the completion of the precipitation of palladium Pd. In this process, the use of water as the solvent causes a violent or rapid replacement reaction among the nickel, copper, palladium and their ions, etc., so that the nickel and copper ions $Ni^{++}$, $Cu^{++}$ are very actively produced. Accordingly a desired amount of precipitation of the platinum metal is achieved in a comparatively short period of time. On the other hand, a long period of time is required for the solution comprising principally of an organic solvent such as butylalcohol and the amounts of the produced nickel ions $Ni^{++}$, etc. are reduced. To take a long period of time for the precipitation is one of the methods for precipitating the catalyst which is difficult to detach from the substrate.

In so far as the precipitation method which includes the immersion or dipping step is concerned, the amount and temperature of the dipping solution and the density of the acid, etc. are counted as the factors for the complete precipitation of the catalysts. The less amount of and the higher temperature of dipping solution and the higher density of acid, the higher speed of precipitation is realized. However, a higher speed of precipitation is not always required in consideration of the attaching force of the precipitated catalyst to the substrate.

As one example, one of the optimum conditions for adding the metal of the platinum group according to the invention is shown such that: the amount of the solution of the salt of the platinum group metal is taken as 10 to 100 times of the apparent volume of the substrate, the solvent of the solution is compared principally of a water-miscible organic solvent which contains 0.5 to 30 percent by volume of water and not more than 5 percent of acid, the temperature of the solution where the substrate is immersed is set in the range of 25° to 30°C, and the period of time for the immersion is taken in the range of 24 to 60 hours.

There is another method, other than the method of adding catalysts as described above, of impregnating the substrate with the solution of salt of the catalyst and heating the impregnated substrate to reduce the same in a reducing environment, for example, in an environment of hydrogen. According to this method, the activities of the nickel and copper formed on the substrate and the activities of the catalysts are decreased because of the heating treatment. Still another methods of adding the catalysts by the use of reducing agents are not recommendable as the methods of adding a slight amount of the catalysts. Because the reducing reaction is violently caused with the result of low force of attachement of the catalyst to the substrate.

Therefore, the most preferable method for adding the metal of the platinum group as the catalyst to the substrate on which the nickel and copper are formed is the method of immersing the substrate into the solution of the salt of the catalyst which is composed principally of an organic solvent such as butylalcohol and precipitating the catalyst by utilizing the difference in the ionization tendency, as described above according to the invention. Use is made of butylalcohol, ethylalcohol, acetone or mixture of them as the organic solvent mentioned above.

DESCRIPTION OF THE PREFERRED EMBODIMENTS

EXAMPLE

Hydrazine electrode for air-hydrazine fuel cell:

Nickel nitrate and copper nitrate were mixed in such a proportion that the ratio of nickel to copper becomes 6 to 4 and an aqueous solution of said nitrates were prepared by adding 80 g. of water per 100 g. of said mixture. A sintered nickel plate of the type well known in the art was immersed in the aqueous solution and dried at 100°C. for 1 hour. Then, the sintered nickel plate was immersed in 25 percent aqueous solution of caustic potash at 40°C. for 20 minutes and further in 10 percent aqueous solution of caustic potash containing 20 percent of hydrazine hydrate and left to stand therein for 6 hours at 45°C. Thereafter, the plate was washed with water thoroughly and dried in air. Thus, a mixture of nickel and copper was added to the sintered substrate. Then, palladium was deposited on the substrate electrode in the proportion of 1.5 mg./cm$^2$ by dipping, at a room temperature, said substrate electrode (having 30 cm$^2$ of one side surface) into 55 cc of butylalcohol containing palladium chloride, 1.4 percent by volume of water and 0.08 percent of hydrochloric acid. This can be attained easily by adjusting the amount of palladium chloride initially used. Thereafter, the substrate electrode thus treated was washed with water and dried in air, whereby an electrode was obtained which will hereinafter be referred to as electrode A.

Figure 1:
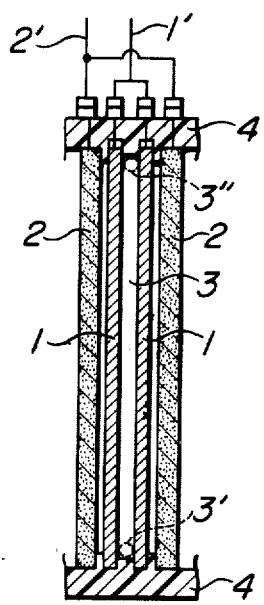
FIG. 1 is a vertical sectional view of an air-hydrazine fuel cell embodying the present invention.
Figure 2:
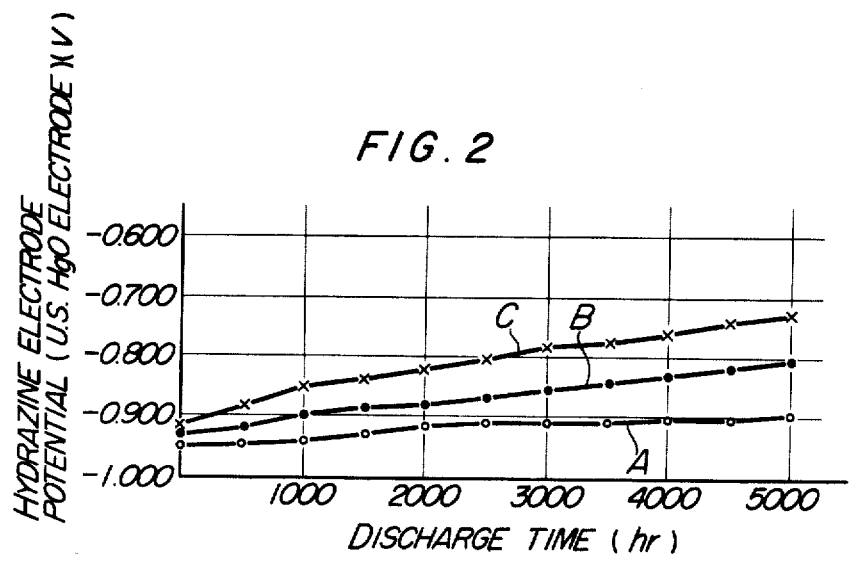
FIG. 2 is a diagram showing the potential vs. time characteristics of a hydrazine electrode according to the present invention.

For comparison, an electrode was produced in the same manner as described above but using nickel nitrate only and another electrode was produced by merely adding palladium only to the sintered nickel plate in the proportion of 3 mg./cm$^2$, which electrodes will hereinafter be referred to as electrodes B and C respectively. These electrodes A, B and C were individually used as the hydrazine electrode of an air-hydrazine fuel cell whose construction is diagrammatically shown in FIG. 1 in vertical crosssection. Referring to FIG. 1 reference numeral 1 designates the hydrazine electrode, 1' a terminal plate of said electrode, 2 a waterproof porous air electrode of the type known in the art, 2' a terminal plate of said air electrode and 3 an aqueous solution of caustic potash having a specific gravity of 1.32 and containing 2.5 percent of hydrazine hydrate, which is supplied through an inlet port 3' and discharged through an outlet port 3''. Reference numeral 4 designates a jar made of polyvinyl chloride. FIG. 2 shows the relationship between the discharge time and the potential of the hydrazine electrode when the individual cells were continuously discharged at a current density of 50 mA/cm$^2$ at 45°C. From the diagram of FIG. 2, it will be seen that the electrode A is very superior in respect of potential and also excellent in respect of durability. Namely, the electrode A is superior to the electrode C in both discharged performance and durability, although the amount of palladium used on the former is half of that on the latter. This fact substantiates that the mixture of nickel and copper provides an excellent carrier for catalyst and adds to the catalytic activity of the electrode and the combined effects of the carrier and palladium remains over an extended period.

As described above, the catalyst according to the present invention is particularly effective for hydrazine. The present inventors further examined the characteristic of the present electrode when used as hydrogen electrode.

Namely, an aqueous solution of nickel nitrate and copper nitrate (the ion ratio of said nitrates being 7 to 3) was added to active carbon and reduced with sodium borohydride, whereby a mixture of nickel boride and copper was attached to the active carbon. After washing with water thoroughly and drying, platinum was further added to the active carbon by the known method. Using the active carbon thus treated and a fluorocarbon resin binder, an electrode was molded under pressure with a metal screen disposed centrally thereof. Upon examining the characteristic of the electrode as hydrogen electrode, it was found that the electrode was superior in respect of both potential and durability to an electrode which was produced by pressure molding active carbon and the binder after adding to said active carbon platinum only or an electrode which was produced by pressure molding active carbon after adding first to said active carbon nickel boride only and then platinum.

It may be understood that the foregoing description that an electrode comprising nickel or nickel boride and copper added thereto serves as an excellent carrier for the conventional catalysts. Additionally, the effect of the electrode proper appears to add to the catalytic activities of the conventional catalysts.

It is to be understood that while in the example described above use was made of nitrates of nickel and copper, other salts of these metals, e.g. sulfates, chlorides and acetates, which are commonly used, may also be used. It is also be be understood that the above-described effect of copper is obtained in accordance with the amount in which copper is added, no matter how little the amount may be, and normally copper is added in an amount from 5 to 70 percent, preferably from 5 to 50 percent.

In producing the catalyst-carrying electrode according to the present invention, such substances as silver, iron, cobalt and tungsten, may be added to nickel in addition to copper and the addition of such substances also produces an appreciable effect.

Having described the invention in connection with a certain specific embodiment thereof, it is to be understood that further modifications would be suggested to those skilled in the art and it is intended to cover such modifications as fall within the scope of the appended claims.

We claim:

1. A method of manufacturing fuel electrodes for fuel cells which carry a catalyst comprising a layer of a mixture of copper and nickel, and at least one metal selected from the platinum group consisting of palladium, platinum, iridium and rhodium and carried by said mixture layer; said method comprising the steps of reducing a mixture of salts of copper and nickel onto an electrode substrate by means of a chemical reducing agent to produce said layer of said mixture on said substrate, and immersing the resulting electrode substrate into a solution of a salt of the metal of the platinum group to deposit said metal of the platinum group onto the surface of the said layer on said substrate due to differences in oxidation potentials between said platinum group metal and said mixture layer.

2. A method according to claim 1, wherein a solvent of said solution is composed principally of an organic solvent soluble in water.

3. A method according to claim 2, wherein said solution contains 0.5 to 30 percent of water in volume ratio.

4. A method according to claim 1, wherein said organic solvent is composed of at least one selected from the group consisting of etylalcohol, butylalcohol and acetone.

5. A method according to claim 1, wherein said mixture further includes one element selected from the group consisting of iron, silver, tungsten and cobalt.

6. In a method of manufacturing fuel electrodes for fuel cells which have a catalyst comprising a layer of a mixture of copper and nickel, and at least one metal selected from the platinum group consisting of palladium, platinum, iridium and rhodium and carried by said layer; said method including steps of immersing an electrode substrate into a solution of salts of nickel and copper, further immersing a resulting immersed electrode into a solution of caustic potash and reducing said salts by a chemical reducing agent to form the layer of mixture of copper and nickel on said substrate, said immersing the substrate formed with said layer into a solution of a salt of the metal of the platinum group to deposit said metal onto said layer by virtue of difference in ionization tendency.

7. In a method of manufacturing fuel electrodes for fuel cells which have a catalyst comprising a layer of a mixture of copper and nickel, and at least one metal selected from the platinum group consisting of palladium, platinum, iridium and rhodium and carried by said layer, said method including steps of: impregnating a porous electrode substrate having many pores with a solution of salts of copper and nickel, producing a layer of a mixture of nickel and copper on a surface of said electrode substrate by reducing said impregnated salts by the use of a chemical reducing agent, and immersing the resulting electrode substrate into a solution of a salt of the at least one metal selected from the platinum group to deposit said metal onto said layer of mixture of nickel and copper by virtue of difference in ionization tendency in such a manner that the pores of said porous electrode remain open.

8. In a method of manufacturing fuel electrodes for fuel cells which have a catalyst comprising a layer of a mixture of copper and nickel, and at least one metal selected from the platinum group consisting of palladium, platinum, iridium and rhodium and carried by said layer, said method including steps of immersing a sintered nickel electrode substrate having many pores into an aqueous solution of salts of nickel and copper; drying the immersed substrate; immersing the dried substrate into an aqueous solution of caustic potash including a chemical reducing agent in order to reduce said salts of nickel and copper to form a layer of a mixture of nickel and copper on a surface of said substrate; and immersing the resulting substrate into a solution of a salt of the metal selected from the platinum group to deposit said metal on said layer by virtue of a difference in ionization tendence in such a manner that the pores of said electrode remain open.

9. A method according to claim 8, wherein a solvent of said solution is composed principally of a water-miscible organic solvent.

10. A method according to claim 8, wherein said solution contains 0.5 to 30 percent of water in volume ratio.

11. A method according to claim 9, wherein said organic solvent is composed of at least one selected from the group consisting of etylalcohol, butylalcohol and acetone.

12. A method of manufacturing fuel electrodes for fuel cells which have a catalyst comprising a layer of a mixture of active carbon, nickel boride and copper, and at least one metal selected from the platinum group consisting of palladium, platinum, iridium and rhodium and carried by said layer, said method comprising the steps of:
   a. adding an aqueous solution of a nickel salt and a copper salt to active carbon;
   b. reducing said nickel salt and copper salt with sodium borohydride to produce a layer of nickel boride and copper on said active carbon; and
   c. immersing the product of step (b) into a solution containing said platinum group metal and chemically reducing said metal of the platinum group onto the layer of said nickel boride and copper.

13. The method according to claim 12, wherein said salts of nickel and copper are selected from the group consisting of nitrates, sulphates, chlorides and acetates.

14. A method of manufacturing fuel electrodes for fuel cells which have a catalyst comprising a layer of a mixture of active carbon, nickel and copper and at least one metal selected from the platinum group consisting of palladium, platinum, iridium and rhodium and carried by said layer, said method comprising the steps of:
   a. adding an aqueous solution of a nickel salt and a copper salt to active carbon;
   b. reducing said nickel salt and copper salt with a chemical reducing agent to produce a layer of nickel and copper on said active carbon; and c. immersing the product of step (b) into a solution containing said platinum group metal and chemically reducing said metal of the platinum group onto the layer of said nickel and copper.

15. A method of manufacturing fuel electrodes for fuel cells which carry a catalyst comprising a layer of a mixture of copper and one member selected from the group consisting of nickel and nickel boride, and at least one metal selected from the platinum group consisting of palladium, platinum, iridium and rhodium and carried by said mixture layer; said method comprising the steps of reducing a mixture of salts of copper and nickel onto an electrode substrate by means of a chemical reducing agent to produce said layer of said mixture on said substrate, and depositing said metal of the platinum group onto the surface of the resulting layer on said substrate due to differences in oxidation potentials between said platinum group metal and said mixture layer.

16. A method according to claim 15, wherein said copper comprises about 5–70 percent of said mixture.

* * * * *